Aug. 15, 1961   W. R. EVANS   2,996,631
SPRING RATE COMPENSATOR
Filed Jan. 12, 1956

INVENTOR.
WALTER R. EVANS
BY
*William P. Lane*
ATTORNEY 2,996,631
SPRING RATE COMPENSATOR
Walter R. Evans, Whittier, Calif., assignor to
North American Aviation, Inc.
Filed Jan. 12, 1956, Ser. No. 558,635
6 Claims. (Cl. 310—40)

This invention is a spring rate compensator and, more particularly, relates to a compensator for the spring rate between the inner case and outer case of a gyroscope.

In the design of mountings between two masses it is often desirable that no restoring torque be present, regardless of relative rotation between the masses. In a gyroscope, torque between the inner case and the outer case may occur, for example, from spring lead-in wires between the two cases, or crinkle wires, or spring or flexure mounting of the cases with respect to each other. These elements create a restoring torque and cause the gyro to drift. This invention is a device which will compensate for all torques between the inner and outer case which are a function of angular displacement between the cases. Upon application of the invention, regardless of slight rotations between the inner case and the outer case, no restoring torque is developed between the cases.

The device is equally applicable to other cases in which one mass is restrained with respect to another with a spring constant existing between them. As one mass deflects with respect to the other, the device of the invention can be used to null, or remove, the restoring force of the spring constant. Such a device is extremely useful in that it allows spring mounting in many cases for which it would not otherwise be suitable.

It is therefore an object of this invention to provide a spring rate compensator.

It is another object of this invention to provide an electrical spring rate compensator of simple and economical construction.

Still another object of this invention is to provide a device capable of developing a torque between two relatively rotatable masses.

A further object of this invention is to provide a combined pickoff and torquer for the output axis of a gyroscope.

Figure 1:
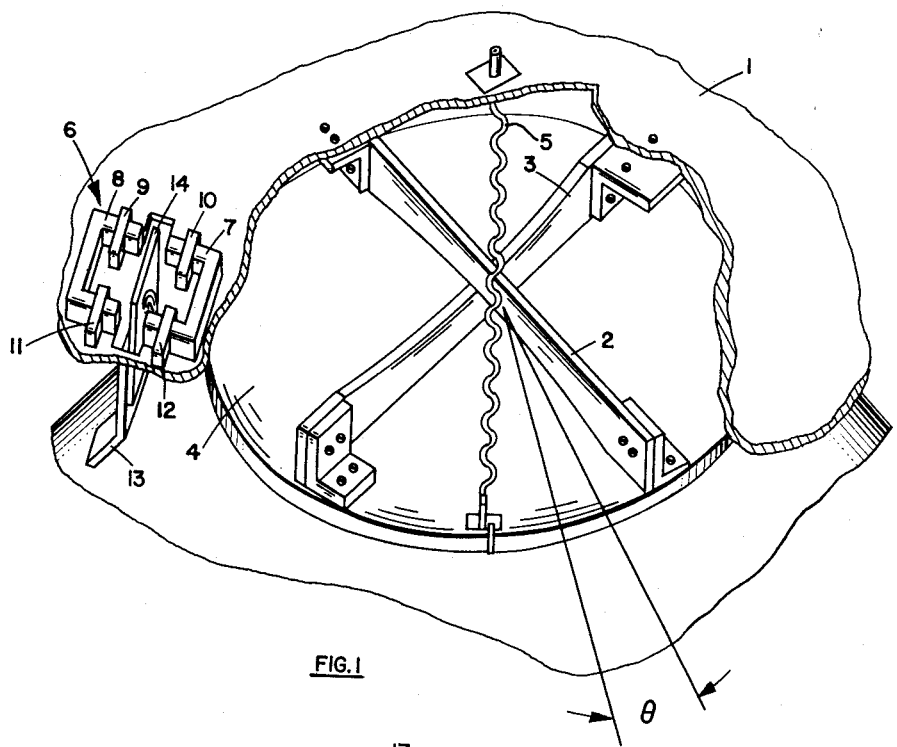
Figure 2:
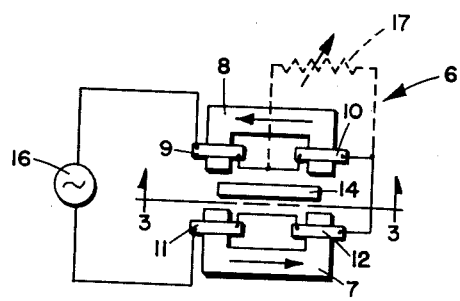
Figure 3:
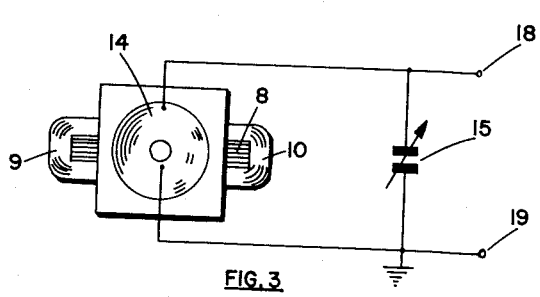

Other objects of the invention will become apparent from the following description taken in connection with the accompanying drawings, in which FIG. 1 is a partial view partially cut away of the output axis of a gyroscope;

FIG. 2 is a schematic diagram of the electrical circuit of the electromagnet of the invention;

And FIG. 3 is an illustration taken on line 3—3 of FIG. 2 and shows the electrical circuit of the coil.

Referring now to FIG. 1, which is the output axis of a gyroscope, case 1, the outer case of the gyroscope, is rigidly connected to flexure springs 2 and 3. At the other end of flexure springs 2 and 3 is connected case 4 which is the inner case of the gyroscope within which the gyro rotor is located. Commonly, instead of flexure springs, low-friction bearings are used to mount case 4 with respect to case 1. Because of the use of flexure springs 2 and 3, if case 4 rotates with respect to case 1, there will be a restoring torque developed by the bending moment of the flexure springs. Spring torque between the inner and outer cases will cause undesirable gyro drift. In addition, a crinkle wire 5 is connected from case 1 to case 4 to provide an electrical lead-in to the gyro motor contained in case 4. Various other lead-in wires may be connected between case 1 and case 4, all of which develop a certain spring rate between the cases. As case 4 rotates with respect to case 1, the restoring torque is a function of the angle of rotation, $\theta$, as follows:

$$T = K\theta \quad (1)$$

where $K$ is a spring constant depending on the design of flexure springs 2 and 3, crinkle wire 5 and the remaining lead-ins. It is desired to remove this restoring torque at all angular rotations, $\theta$. This is accomplished by the spring rate compensator 6 which shows two U-shaped laminated cores 7 and 8 having coils 9, 10, 11 and 12 wound on respective arms thereof, which cores are located on case 1. A bracket 13 connected on case 4 is rigidly connected to a pancake type coil 14. The coil 14 is symmetrically disposed within the electromagnetic field produced by the cores 7 and 8 and their coils.

FIG. 2 is a top view illustrating the electrical connections of the coils 9, 10, 11 and 12 and indicates that reinforcing magnetic fields are produced in the cores 7 and 8. As long as pancake coil 14 lies symmetrically disposed with respect to cores 7 and 8, no voltage, or at least a minimum of voltage, is induced within the pancake coil. As it deflects to the left, voltage is induced; and as it deflects to the right, voltage is induced. If the pancake coil is moved from right to left, or vice versa, a phase shift of 180° occurs in the voltage induced in the coil. It would be desirable that no voltage be induced in coil 14 in its central, symmetrical position with respect to the cores 7 and 8. If the voltage in coil 14 never drops to zero, it means that there is a phase difference in the fluxes in cores 7 and 8 (i.e., their vector sum is not zero). To correct for this, a variable resistor 17, FIG. 2, may be attached across coil 10 which acts to shift the phase of the flux created. If no improvement occurs, the resistor may be connected across another coil or coils, such as 11 and 12. The voltage across pancake coil 14 would then pass through zero at its central position while shifting phase.

FIG. 3 is a view taken on line 3—3 of FIG. 2 and shows more clearly the pancake coil 14, centrally disposed with respect to cores 8 and 7 (core 7 not shown). Across the ends of pancake coil 14 is connected variable capacitor 15, which may be grounded, as shown. Capacitor 15 is adjusted until the restoring force is removed.

The compensator 6, when connected as shown, operates both as a pickoff to detect any relative rotation between case 4 and case 1 of FIG. 1, and as a torquer to provide an anti-restoring force proportional to the amount of rotation. The signal indicating relative rotation appears across coil 14. Shorting coil 14 by a capacitor, or a capacitive load, will operate to accomplish this purpose. It is desirable that this load be capacitive because the voltage induced in pancake coil 14 lags by 90° the flux produced by cores 7 and 8. The capacitive load, then, places the current flow in the coil 14 90°, or thereabouts, ahead of the induced voltage, and an anti-restoring torque is developed between pancake coil 14 and cores 7 and 8. The anti-restoring torque, $T'$, developed by the device, is also a direct function of the angular rotation, $\theta$ of case 4 as follows:

$$T' = K'\theta \quad (2)$$

where $K'$ is a constant dependent on coil design, the lever arm of pancake coil 14 and various other factors such as the voltage induced in coil 14 and the frequency of the A.-C. source 16. At terminals 18 and 19 may be obtained a pickoff signal indicating by its amplitude the amount of deflection and by its phase the direction of deflection.

The concept of the invention is, then, to obtain a torque-free bearing between two masses by a spring rate compensator which develops an anti-restoring torque dependent on the rotation between the masses. The anti-restoring torque counteracts the restoring torque of the spring rate between the masses.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A spring rate compensator wherein two masses are spring restrained with respect to each other, said compensator comprising an alternating current electromagnet, a coil secured to one of said masses and symmetrically disposed in the magnetic field of said electromagnet so that a minimum of voltage is induced in said coil, said electromagnet being secured to the other of said masses, a predominantly capacitive load connected to said coil whereby the current in said coil leads the voltage in said coil by substantially 90 degrees, whereby a force is placed on said coil upon deflection with respect to said electromagnet.

2. A spring rate compensator wherein two masses are spring restrained with respect to each other, said spring rate compensator comprising a pair of alternating current electromagnets, a coil secured to one of said masses and symmetrically disposed within the field of said electromagnets so that a minimum of voltage is induced in said coil, said electromagnets secured to the other of said masses, a predominantly capacitive load connected to said coil whereby the current in said coil leads the voltage induced in said coil by substantially 90 degrees whereby a force is placed on said coil upon deflection with respect to said electromagnets.

3. In combination, a first mass, a second mass, spring restraining means between first and second masses, said spring restraining means allowing relative deflection between said masses, two U-shaped alternating current electromagnets secured to said first mass, the pole faces of each of said electromagnets facing and reinforcing pole faces of the other electromagnet, a coil secured to said second mass and disposed symmetrically between the pole faces of said electromagnets, said coil relatively movable with respect to said electromagnet in response to movement of said second mass, whereby a voltage and a current are induced in said coil proportional to the movement of said second mass, a predominantly capacitive load connected to said coil, to cause said current to lead said voltage by substantially ninety degrees.

4. The combination recited in claim 3 wherein is included impedance means connected across at least one of said electromagnets for shifting the phase of the flux therein.

5. A pair of masses resiliently interconnected by spring restraining means for relative displacement, a coil secured to one of said masses, alternating current electromagnetic means secured to the other of said masses for magnetically inducing in said coil an electromotive force and electric current having a magnitude and polarity in accordance with the magnitude and direction of relative displacement between said masses, and means electrically connected to said coil for causing said current to lead said electromotive force by substantially ninety degrees.

6. A spring rate compensator comprising two masses, means for spring restraining said masses with respect to each other, an alternating current electromagnet secured to one of said masses, a coil disposed within the field of said electromagnet, said coil secured to the other of said masses and relatively movable with respect to said electromagnet in response to relative angular movement between said masses, a highly capacitive load connected to said coil whereby the current in said coils leads the voltage by substantially 90 degrees.

References Cited in the file of this patent

UNITED STATES PATENTS

| | | |
|---|---|---|
| 1,267,214 | Hall | May 21, 1918 |
| 1,324,054 | Irwin | Dec. 9, 1919 |
| 1,351,027 | Davis | Aug. 31, 1920 |
| 2,349,287 | Krussman | May 23, 1944 |
| 2,592,417 | Hale | Aug. 8, 1952 |
| 2,709,921 | Sylvan | June 7, 1955 |
| 2,712,757 | Schaberg | July 12, 1955 |
| 2,720,620 | Power | Oct. 11, 1955 |

FOREIGN PATENTS

| | | |
|---|---|---|
| 265,949 | Great Britain | July 28, 1927 |